US005723273A

United States Patent [19]

Anderson et al.

[11] Patent Number: 5,723,273

[45] Date of Patent: Mar. 3, 1998

[54] PROTECTIVE OVERCOAT FOR ANTISTATIC LAYER

[75] Inventors: Charles Chester Anderson; Yongcai Wang, both of Penfield; James L. Bello, Rochester; Mario D. DeLaura, Hamlin, all of N.Y.

[73] Assignee: Eastman Kodak Company, Rochester, N.Y.

[21] Appl. No.: 712,018

[22] Filed: Sep. 11, 1996

[51] Int. Cl.[6] .............................. G03C 1/85; G03C 1/93; G03C 1/76; B32B 7/30

[52] U.S. Cl. .............................. 430/527; 430/215; 430/529; 430/536; 430/537; 430/961; 428/500; 428/522

[58] Field of Search .............................. 430/527, 529, 430/536, 537, 627, 961, 215; 428/500, 522

[56] References Cited

U.S. PATENT DOCUMENTS

| | | | |
|---|---|---|---|
| 3,033,679 | 10/1962 | Laakso et al. | 430/527 |
| 3,437,484 | 4/1969 | Nadeau | 430/527 |
| 3,525,621 | 8/1970 | Miller | 430/527 |
| 3,630,740 | 12/1971 | Joseph et al. | 430/529 |
| 3,681,070 | 8/1972 | Timmerman et al. | 430/529 |
| 3,895,949 | 7/1975 | Akamatsu et al. | 430/273 |
| 4,070,189 | 1/1978 | Kelley et al. | 430/527 |
| 4,203,769 | 5/1980 | Guestaux | 430/527 |
| 4,237,194 | 12/1980 | Upson et al. | 430/527 |
| 4,308,332 | 12/1981 | Upson et al. | 430/528 |
| 4,497,917 | 2/1985 | Upson et al. | 523/201 |
| 4,526,706 | 7/1985 | Upson et al. | 430/527 |
| 4,542,095 | 9/1985 | Steklenski et al. | 430/527 |
| 4,612,279 | 9/1986 | Steklenski et al. | 430/527 |
| 4,735,976 | 4/1988 | Steklenski et al. | 430/527 |
| 4,916,011 | 4/1990 | Miller | 430/527 |
| 4,954,559 | 9/1990 | Den Hartog et al. | 524/507 |
| 5,006,451 | 4/1991 | Anderson et al. | 430/527 |
| 5,166,254 | 11/1992 | Nickle et al. | 524/512 |
| 5,204,404 | 4/1993 | Werner et al. | 524/501 |
| 5,219,916 | 6/1993 | Den Hartog et al. | 524/507 |
| 5,221,598 | 6/1993 | Anderson et al. | 430/527 |
| 5,314,945 | 5/1994 | Nickle et al. | 524/507 |
| 5,366,855 | 11/1994 | Anderson et al. | 430/527 |
| 5,447,832 | 9/1995 | Wang et al. | 430/523 |

OTHER PUBLICATIONS

Journal of Applied Polymer Science, vol. 39, pp. 2119–2128, 1990.

*Primary Examiner*—Richard L. Schilling
*Attorney, Agent, or Firm*—Carl F. Ruoff

[57] ABSTRACT

The present invention is an imaging element which includes a support and at least one image forming layer. The imaging element further includes an antistatic layer and a protective layer overlying the antistatic layer. The protective layer is formed from an aqueous coating solution containing a film forming binder and a crosslinking agent. The film forming binder is a carboxylic containing vinyl polymer or copolymer having a glass transition temperature of greater than 50° C. and an acid number of from 60 to 260. The carboxylic acid group of the vinyl polymer or copolymer are reacted with ammonia or amine to provide a pH of the coating solution of from 7 to 10.

11 Claims, No Drawings

PROTECTIVE OVERCOAT FOR ANTISTATIC LAYER

This application relates to commonly assigned copending application Ser. No. 08/712,019, Express Mail No. TB44098559X which is filed simultaneously herewith and hereby incorporated by reference for all that it discloses. This application relates to commonly assigned copending Ser. No. 08/712,006, Express Mail No. TB440987360 which is filed simultaneously and hereby incorporated by reference for all that it discloses. This application relates to commonly assigned copending application Ser. No. 08/712,010, Express Mail No. TB44098735X which is filed simultaneously herewith and hereby incorporated by reference for all that it discloses. This application relates to commonly assigned copending application Ser. No. 08/712,017, Express Mail No. TB440987371 which is filed simultaneously herewith and hereby incorporated by reference for all that it discloses. This application relates to commonly assigned copending application Ser. No. 08/712,016, Express Mail No. TB440987404 which is filed simultaneously herewith and hereby incorporated by reference for all that it discloses.

FIELD OF THE INVENTION

This invention relates in general to imaging elements, and in particular to imaging elements comprising a support material containing a layer which provides protection against the generation of static and a protective layer which overlies the antistatic layer. The protective layer is coated from an aqueous coating solution containing a film forming binder comprising a carboxylic acid containing vinyl polymer or copolymer. The invention provides coating compositions that have improved manufacturing and film forming characteristics. The protective layer exhibits superior physical properties including exceptional transparency and toughness necessary for providing resistance to scratches, abrasion, blocking, and ferrotyping. In addition, coatings of the present invention provide a reduction in the amount of volatile organic compounds emitted during the drying process, and are, therefore, more attractive from an environmental standpoint.

BACKGROUND OF THE INVENTION

It is well recognized in the photographic industry that there is a need to provide photographic film and paper with antistatic protection. Such protection is important since the accumulation of static charges as a result of various factors in the manufacture, finishing, and use of photographic elements is a serious problem in the photographic art. Accumulation of static charges can result in fog patterns in photographic emulsions, various coating imperfections such as mottle patterns and repellency spots, dirt and dust attraction which may result in the formation of "pinholes" in processed films, and a variety of handling and conveyance problems.

To overcome the problem of accumulation of static charges it is conventional practice to provide an antistatic layer (i.e., a conductive layer) in photographic elements. A very wide variety of antistatic layers are known for use in photographic elements. For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and a alkyl-substituted trifunctional aziridine crosslinking agent are disclosed. An antistatic layer comprising a vanadium pentoxide colliodal gel is described in U.S. Pat. No. 4,203,769. U.S. Pat. Nos. 4,237,194, 4,308,332, and 4,526,706 describe antistats based on polyaniline salt-containing layers. Crosslinked vinylbenzyl quaternary ammonium polymer antistatic layers are described in U.S. Pat. No. 4,070,189.

Frequently, the chemicals in a photographic processing solution are capable of reacting with or solubilizing the conductive compounds in an antistatic layer, thus causing a diminution or complete loss of the desired antistatic properties. To overcome this problem, antistatic layers are often overcoated with a protective layer to chemically isolate the antistatic layer and in the case of backside (that is, the side opposite to the imaging layer) antistatic layers the protective layer may also serve to provide scratch and abrasion resistance.

Frequently, the protective layer is a glassy polymer with a glass transition temperature (Tg) of 70° C. or higher that is applied from organic solvent-based coating solutions. For example, in the aforementioned U.S. Pat. No. 4,203,769 the vanadium pentoxide antistatic layer may be overcoated with a cellulosic protective layer applied from an organic solvent. U.S. Pat. Nos. 4,612,279 and 4,735,976 describe organic solvent-applied protective overcoats for antistatic layers comprising a blend of cellulose nitrate and a copolymer containing acrylic acid or methacrylic acid. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 40° C. Typically these polymers are used in priming or "subbing" layers which are applied onto the film support to act as adhesion promoting layers for photographic emulsion layers. Such low Tg polymers, although useful when they underlay an emulsion layer, may not be suitable as, for example, backing layers since their blocking and ferrotyping resistance may be poor. To fully coalesce a polymer latex with a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C.

U.S. Pat. Nos. 5,006,451 and 5,221,598 disclose the use of polymer barrier layers applied over a vanadium pentoxide antistatic subbing layer that prevents the loss of antistatic properties in photographic film processing. These barrier layers provide excellent adhesion to overlying gelatin-containing layers, but, their resistance to blocking, ferrotyping, scratches, and abrasion is inadequate.

U.S. Pat. Nos. 5,447,832 and 5,366,855 describe for imaging elements a coalesced layer comprising film-forming colloidal polymer particles and non-film forming colloidal polymer particles. Those layers are coated from an aqueous medium and contain polymer particles of both high and low glass transition temperatures. Typically, the film forming colloidal polymer particles are of low Tg polymers, and are present in the coated layers from 20 to 70 percent by weight.

U.S. Pat. No. 3,895,949 describes a photosensitive element having a layer of photosensitive material that is overcoated with a protective layer containing a copolymer obtained by reaction between about 10 to 70 percent by weight of an unsaturated carboxylic acid and at least one ethylenically unsaturated compound comprising up to 40 percent by weight of a hard component such as styrene or methyl methacrylate and about 50 to 30 percent by weight of a soft component such as ethyl acrylate, or butyl acrylate. Polymer particles that have such compositions are of low Tg, and therefore can coalesce and form a transparent film very easily under normal drying conditions used for manufacturing photographic elements. However, these low Tg polymers are not desirable as, for example, backing layers since their blocking and ferrotyping resistance are poor.

U.S. Pat. Nos. 5,166,254 and 5,219,916 describe a water-based coating composition containing mixtures of an acrylic latex and an acrylic hydrosol. The acrylic latex contains 1 to 15% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. Nos. 5,314,945 and 4,954,559 describe a water-based coating composition containing an acrylic latex and a polyurethane. The acrylic latex contains 1 to 10% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. No. 5,204,404 describes a water-based coating composition containing mixture if a dispersed acrylic silane polymer and a polyurethane. The acrylic silane polymer contains 1 to 10% of silane containing acrylates, 0.1 to 10% of carboxylic acid containing monomer, and 2 to 10% of hydroxyl containing monomer. The polymer has a Tg of from −40° to 25° C. and a molecular weight of from 500,000 to 3,000,000.

Film formation from a coating composition in general involves the deposition of a coating liquid onto a substrate and its transformation into an adherent solid coating. During such a process, the solvent must be removed without adversely affecting the performance properties of the coating and without introducing defects into the coating. The drying step is therefore extremely important in defect formation because it is the last step in the process where the chemistry and physical properties of the product can be affected. For a perfect solid coating to form, the film must remain liquid long enough after deposition to allow the surface defects to flow out and disappear. However, if the wet coating remains as a low viscosity liquid for too long a time period, non-uniform airflow in the dryer can cause non-uniform flow of the wet coating at the surface, resulting in the formation of so-called drying mottle. Drying mottle is defined as an irregularly patterned defect that can be gross, and at times it can have an iridescent pattern. The iridescence pattern is very objectionable to a customer. For example, in the case of microfilms, customers normally view the image as film is lighted from the backside. If the backing layer exhibits an iridescence pattern, it can have a deleterious effect on the ability of a customer to view the image.

For coating compositions comprising solution polymers, the viscosity of the coating during drying is a strong function of polymer concentration. Their film formation ability is therefore very good, the dried film is uniform, and its surface is fairly smooth. For aqueous coating compositions comprising water insoluble polymer particles, the viscosity build-up during drying is a very slow function of solids. The wet coating surface is therefore very prone to air disturbance and to surface tension forces. Consequently, films formed from aqueous coating compositions comprising water insoluble polymer particles often exhibit an objectionable iridescence pattern.

Film formation from aqueous coating compositions comprising water insoluble polymer particles also involves particle packing and deformation. Particles have to experience a significant amount of deformation to form a continuous, transparent film. The pressure profile due to particle elastic deformation is such that the particle is in compression at the center of the particle and in tension at the edges. As long as there is no polymer flow or polymer chain diffusion across the particle-particle interface, as is the case in photographic support coating applications due to very limited dryer length and very short drying time, the particle-particle interface is very weak, and internal stress will tend to separate the particle along that interface. Unless the dried coating experiences further heat relaxation at high temperature, the internal stress will persist and result in adhesion failure at the particle-particle interface or the particle-substrate interface.

In recent years, the conditions under which the imaging elements are manufactured and utilized have become even more severe. This is either because applications for imaging elements have been extended to more severe environments or conditions, for example, higher temperatures must be withstood during manufacturing, storage, or use, or because manufacturing and processing speeds have been increased for greater productivity. Under these conditions, the above mentioned methods to obtain aqueous coating compositions for protective overcoats that are free of organic solvents become deficient with regard to Simultaneously satisfying all of the physical, chemical, and manufacturing requirements for such a layer. A foremost objective of the present invention is therefore to provide an aqueous coating composition for a protective layer that overlies an antistatic layer in which the coating composition used to form the protective layer is essentially free of organic solvent. The protective overcoat has excellent film forming characteristics under the drying conditions used for imaging support manufacturing processes, forms a dried layer free of drying mottle, and protects the antistatic layer from film processing solutions. When the protective overcoat compositions serve as the outermost layer on the backside of an imaging element they provide excellent resistance to scratches, abrasion, blocking, and ferrotyping.

SUMMARY OF THE INVENTION

In accordance with the present invention, an image element comprises a support having thereon an antistatic layer and an overlying protective layer formed from an aqueous coating solution containing a film forming binder and a crosslinking agent, wherein the binder comprises a carboxylic acid containing vinyl polymer or copolymer having a glass transition temperature of greater than 50° C. and an acid number of from 60 to 260. The carboxylic acid groups of the polymer or copolymer are reacted with ammonia or amine to provide a pH of the composition of about 7 to 10. The crosslinking agent is capable of reacting with the the polymer or copolymer to improve the resistance of the layer to processing solution.

DESCRIPTION OF THE INVENTION

The imaging elements to which this invention relates can be any of many different types depending on the particular use for which they are intended. Such elements include, for example, photographic, electrostatographic, photothermographic, migration, electrothermographic, dielectric recording, and thermal dye transfer imaging elements.

The support material used in this invention can comprise various polymeric films, papers, glass, and the like, but both acetate and polyester supports well known in the art are preferred. The thickness of the support is not critical. Support thicknesses of 2 to 10 mil (0.002 to 0.010 inches) can be used. The polyester support typically employs an undercoat or subbing layer well known in the art that comprises, for example, for polyester support a vinylidene chloride/methyl acrylate/itaconic acid terpolymer or vinylidene chloride/acrylonitrile/acrylic acid terpolymer.

The layers of this invention can be employed on either side or both sides of the support. The protective overcoat layer of the invention may serve as the outermost layer of the imaging element or it may be overcoated with other layers well known in the imaging art, for example, it may be overcoated with receiving layers, timing layers, antihalation layers, stripping layers, transparent magnetic layers, and the like. The layers in accordance with this invention are particularly advantageous when they are present as the outermost layers on the side of the support opposite to the imaging layer due to superior physical properties including resistance to scratches, abrasion, blocking, and ferrotyping.

Coating compositions for forming the protective overcoat layers in accordance with the present invention comprise a continuous aqueous phase containing a film forming binder and a crosslinking agent, wherein the binder comprises a carboxylic acid containing vinyl polymer or copolymer having a glass transition temperature of greater than 50° C. and an acid number of from 60 to 260, preferably from 60 to 150. Acid number is in general determined by titration and is defined as the number of milligrams of KOH required to neutralize 1 gram of the polymer. The carboxylic acid groups of the polymer or copolymer are reacted with ammonia or amine to provide a pH of the composition of about 7 to 10. The glass transition temperature of the polymer is measured before neutralization of its carboxylic acid groups with ammonia or amine. If the acid number of the polymer is less than 60, the resultant coating does not form a transparent film. If the acid number of the polymer is larger than 260, the resultant aqueous coating has a high viscosity. In addition, even in the presence of high concentrations of crosslinking agent, the resultant dried coating obtained for polymers having an acid number greater than 260 may have poor resistance to film processing solutions. Other additional compounds may be added to the protective overcoat layer coating composition, including surfactants, emulsifiers, coating aids, matte particles, rheology modifiers, inorganic fillers such as metal oxide particles, pigments, magnetic particles, biocide, and the like. The coating composition may also include a small amount of organic solvent, preferably the concentration of organic solvent is less than 1 percent by weight of the total coating composition.

The vinyl polymers or copolymers useful for the protective overcoat layer of the present invention include those obtained by interpolymerizing one or more ethylenically unsaturated monomers containing carboxylic acid groups with other ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrenecarboxylic acid.

When the polymerization is carried out using a hydroxyl-containing monomer such as a $C_2$–$C_8$ hydroxyalkyl ester of acrylic or methacrylic acid, a vinyl polymer containing a hydroxyl group as well as a carboxyl group can be obtained.

The vinyl polymers according to the present invention may be prepared by conventional solution polymerization methods, bulk polymerization methods, emulsion polymerization methods, suspension polymerization methods, or dispersion polymerization methods. The polymerization process is initiated in general with free radical initiators. Free radicals of any sort may be used. Preferred initiators include persulfates (such as ammonium persulfate, potassium persulfate, etc.), peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodium hydrogen sulfate, etc.). Common chain transfer agents or mixtures thereof known in the art, such as alkyl-mercaptans, can be used to control the polymer molecular weight.

When solution polymerization is employed, examples of suitable solvent medium include ketones such as methyl ethyl ketone, methyl butyl ketone, esters such as ethyl acetate, butyl acetate, ethers such as ethylene glycol monobutyl ether, and alcohols such as 2-propanol, 1-butanol. The resultant vinyl polymer can be redispersed in water by neutralizing with an amine or ammonia. The organic solvent is then removed by heating or distillation. In this regard, organic solvents which are compatible with water are preferred to be used as reaction medium during solution polymerization. Suitable examples of amines which can be used in the practice of the present invention include diethyl amine, triethyl amine, isopropyl amine, ethanolamine, diethanolamine, and morpholine.

A preferred method of preparing the vinyl polymer of the present invention is by an emulsion polymerization process where ethylenically unsaturated monomers are mixed together with a water soluble initiator and a surfactant. The emulsion polymerization process is well known in the art (see, for example, Padget, J. C., in *Journal of Coating Technology*, Vol 66, No. 839, pages 89–105, 1994; El-Aasser, M. S. and Fitch, R. M. Ed., *Future Directions in Polymer Colloids*, NATO ASI Series, No 138, Martinus Nijhoff Publishers, 1987; Arshady, R., *Colloid & Polymer Science*, 1992, No 270, pages 717–732; Odian, G., *Principles of Polymerization*, 2nd Ed. Wiley (1981); and Sorenson, W. P. and Campbell, T. W., *Preparation Method of Polymer Chemistry*, 2nd Ed, Wiley (1968)). The polymerization process is initiated with free radical initiators. Free radicals of any sort can be used. Preferred initiators include those already described. Surfactants which can be used include, for example, a sulfate, a sulfonate, a cationic compound, an amphoteric compound, or a polymeric protective colloid. Specific examples are described in "McCUTCHEON'S Volume 1: Emulsifiers & Detergents, 1995, North American Edition".

The vinyl polymer particles made by emulsion polymerization are further treated with ammonia or amine to neutralize carboxylic acid groups and adjust the dispersion to pH values from 7 to 10.

Crosslinking comonomers can be used in the emulsion polymerization to lightly crosslink the polymer particles. It is prefered to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctuional aromatic compounds such as divinyl benzene.

The protective overcoat layer coating composition in accordance with the invention also contains suitable crosslinking agents which can react with the binder polymer or copolymer in order to improve the resistance of the layer to film processing solutions. Suitable crosslinking agents include epoxy compounds, polyfunctional aziridines, methoxyalkyl melamines, triazines, polyisocyanates, carbodiimides, and the like. Preferably, the crosslinking agent is present in the amount from 1 to 30 weight percent, preferably from 5 to 25, of the carboxylic acid containing polymer or copolymer.

Matte particles well known in the art may be used in the protective overcoat coating compositions of the invention, such matting agents have been described in Research Disclosure No. 308, published Dec. 1989, pages 1008 to 1009. When polymer matte particles are employed, the polymer may contain reactive functional groups capable of forming covalent bonds with the binder polymer by intermolecular crosslinking or by reaction with the crosslinking agent in order to promote improved adhesion of the matte particles to the coated layers. Suitable reactive functional groups include: hydroxyl, carboxyl, carbodiimide, epoxide, aziridine, and the like.

The protective overcoat coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964; in British Patent Nos. 1,263,722; 1,198,387; 1,430,997; 1,466,304; 1,320,757; 1,320,565; and 1,320,756; and in German Patent Nos. 1,284,295 and 1,284,294; (3) liquid paraffin and paraffin or wax-like materials such as carnauba wax, natural and synthetic waxes, petroleum waxes, mineral waxes and the like; (4) perfluoro- or fluoro- or fluorochloro-containing materials, which include poly(tetrafluoroethlyene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in *Research Disclosure* No.308, published Dec. 1989, page 1006.

The protective overcoats of the present invention may be successfully employed with a variety of antistatic layers well known in the art. Particularly useful antistatic layers include those described in aforementioned U.S. Pat. Nos. 4,070,189; 4,203,769; 4,237,194; 4,308,332; and 4,526,706, for example.

The antistatic layer described in U.S. Pat. No. 4,203,769 is prepared by coating an aqueous colloidal solution of vanadium pentoxide. Preferably, the vanadium pentoxide is doped with silver. A polymer binder, such as a vinylidene chloride-containing terpolymer latex or a polyesterionomer dispersion, is preferably employed in the antistatic layer to improve the integrity of the layer and to improve adhesion to the undercoat layer. The weight ratio of polymer binder to vanadium pentoxide can range from about 1:5 to 200:1, but, preferably 1:1 to 10:1. The antistatic coating formulation may also contain a wetting aid to improve coatability. Typically, the antistat layer is coated at a dry coverage of from about 1 to 200 $mg/m^2$.

Antistatic layers described in U.S. Pat. No. 4,070,189 comprise a crosslinked vinylbenzene quaternary ammonium polymer in combination with a hydrophobic binder wherein the weight ratio of binder to antistatic crosslinked polymer is about 10:1 to 1:1.

The antistatic compositions described in U.S. Pat. Nos. 4,237,194; 4,308,332; and 4,526,706 comprise a coalesced, cationically stabilized latex and a polyaniline acid addition salt semiconductor wherein the latex and the semiconductor are chosen so that the semiconductor is associated with the latex before coalescing. Particularly preferred latex binders include cationically stabilized, coalesced, substantially linear, polyurethanes. The weight ratio of polymer latex particles to polyaniline in the antistatic coating composition can vary over a wide range. A useful range of this weight ratio is about 1:1 to 20:1. Typically, the dried coating weight of this antistatic layer is about 40 $mg/m^2$ or less.

The coating compositions of the invention can be applied by any of a number of well-know techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in *Research Disclosure* No. 308, Published Dec. 1989, pages 1007 to 1008.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure*, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure*, Item 36544, September, 1994, and the references listed therein.

The photographic silver halide emulsions utilized in this invention can contain other addenda conventional in the photographic art. Useful addenda are described, for example, in *Research Disclosure*, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention will now be described in detail with reference to examples; however, the present invention should not be limited to these examples.

The examples demonstrate the benefits of the aqueous protective overcoat and antistatic coating compositions of the present invention, and in particular show that the coating compositions of the present invention have excellent film-forming characteristics under drying conditions typically used in photographic support manufacturing process. The protective overcoat layers exhibit superior physical properties including exceptional transparency, resistance to film processing solutions so that the antistatic properties of the imaging element remain after film processing, and, when the protective overcoat serves as the outermost layer, it provides excellent resistance to scratches, abrasion, blocking, and ferrotyping.

EXAMPLES

Preparation of Aqueous Coating Compositions Used in the Example Coatings

The aqueous coating compositions used in the example coatings are prepared by first forming a carboxylic acid containing copolymer latex and mixing the latex with other components used in the coating composition.

The following gives an example for the preparation of an aqueous coating composition from a poly(methyl methacrylate-co-methacrylic acid) latex. It is understood other aqueous coating compositions can be prepared in a similar manner.

A stirred reactor containing 1012 g of deionized water and 3 g of Triton 770 surfactant (Rohm & Haas Co.) is heated to 80° C. and purged with $N_2$ for 1 hour. After addition of 1 g of potassium persulfate, an emulsion containing 2.7 g of Triton 770 surfactant, 267 g of deionized water, 255 g of methyl methacrylate, 45 g of methacrylic acid, 6 g of methyl-3-mercaptopropionate chain transfer agent, and 0.5 g of potassium persulfate is slowly added over a period of 1 hour. The reaction is allowed to continue for 4 more hours before the reactor is cooled down to room temperature. The latex prepared is filtered through an ultrafine filter (5 μm cut-off) to remove any coagulum. The polymer particle so prepared has an acid number of 97.8 and a weight average molecular weight of 24,000. The latex has a pH value of 2.0–2.5.

The pH of the poly(methyl methacrylate-co-methacrylic acid) latex so prepared is then adjusted with a 20 wt % triethyl amine solution. The mixture is stirred overnight and an appropriate amount of water is added to give a final solids of about 7 wt %.

Comparative Samples A–I and Examples 1–13

The following examples show that the coating compositions of the invention provide transparent and void-free, impermeable films that are comparable with layers applied using soluble polymers. A polyethylene terephthalate film support that had been subbed with a terpolymer latex of vinylidene chloride, methyl acrylate, and itaconic acid was coated with an aqueous antistatic formulation comprising 0.025 weight % of silver-doped vanadium pentoxide, 0.075 weight % of a terpolymer latex of methylacrylate, vinylidene chloride, and itaconic acid (15/83/2) and dried at 100° C. to yield an antistatic layer having a dry weight of about 8 mg/m$^2$. Aqueous coating solutions comprising 7 wt % total solids were applied onto the abovementioned antistatic layer and the coatings dried at 100° C. for 2 minutes to give protective overcoat layers with a dry coating weight of 1076 mg/m$^2$, and the coating appearance was recorded. The coating compositions and results are reported in Table 1. Transparent, exceptional-quality films that are comparable in appearance to organic solvent applied coatings are obtained for the coating composition of the invention.

In Table 1, CTA represents methyl-3-mercaptopropionate or dedecyl mercaptan chain transfer agent used in making the vinyl polymers, MMA represents methyl methacrylate, MAA represents methacrylic acid, AA represents acrylic acid, BA represents butyl acrylate, EMA represents ethyl methacrylate, and HEMA represents hydroxyl ethyl methacrylate. Table 1 also shows the pH value of the coating compositions. In Table 1, all the vinyl copolymers comprising either ethyl methacrylate or methyl methacrylate have a Tg value of greater than 50° C.

Comparative samples A–D are prepared from aqueous coating compositions containing vinyl copolymer latexes at low pH, and the resultant coatings are hazy and non-transparent. Comparative samples E–G and I are prepared from aqueous coating compositions containing vinyl polymers having an acid number less than 60 at high pH and the resultant coatings are hazy and non-transparent. Comparative sample H is prepared from an aqueous coating composition containing a vinyl polymer having a Tg value of 73° C. and an acid number of 65.2 at low pH, and the resultant coating is hazy and non-transparent. On the other hand, transparent, exceptional-quality films that are comparable in appearance to organic solvent applied coatings are obtained for the coating compositions of the invention.

TABLE 1

| Coating | Polymer | CTA (wt %) | Acid Number | pH | Appearance |
|---|---|---|---|---|---|
| Sample A | EMA/MAA 95/5 wt % | 0 | 32.5 | 2–2.5 | Hazy/White |
| Sample B | MMA/MAA 90/10 wt % | 2 | 65.2 | 2–2.5 | Hazy/White |
| Sample C | EMA/MAA 90/10 wt % | 0 | 65.2 | 2–2.5 | Hazy/White |
| Sample D | EMA/MAA 85/15 wt % | 1 | 97.8 | 2–2.5 | Hazy |
| Sample E | MMA/MAA 95/5 wt % | 2 | 32.5 | 9.09 | Hazy/White |
| Sample F | MMA/AA 92.5/7.5 wt % | 0 | 58.4 | 9.0 | Hazy |
| Sample G | MMA/AA 92.5/7.5 wt % | 2 | 58.4 | 9.0 | Hazy |
| Sample H | MMA/BA/MAA 65/25/10 wt % (Tg = 73° C.) | 0 | 65.2 | 2–2.5 | Hazy |
| Sample I | MMA/HEMA/MAA 75/20/5 wt % | 0 | 32.5 | 9.0 | Hazy |
| Example 1 | MMA/AA 90/10 wt % | 0 | 77.9 | 9.08 | Excellent |
| Example 2 | MMA/AA 90/10 wt % | 2 | 77.9 | 9.46 | Excellent |
| Example 3 | MMA/AA 87.5/12.5 wt % | 1 | 97.3 | 9.75 | Excellent |
| Example 4 | MMA/MAA 87.5/12.5 wt % | 1 | 81.5 | 9.0 | Excellent |
| Example 5 | MMA/MAA 85/15 wt % | 0 | 97.8 | 8.30 | Excellent |
| Example 6 | MMA/MAA 85/15 wt % | 1 | 97.8 | 9.61 | Excellent |
| Example 7 | MMA/MAA 80/20 wt % | 0 | 130.4 | 7.53 | Excellent |
| Example 8 | MMA/MAA 80/20 wt % | 1 | 130.4 | 9.75 | Excellent |

TABLE 1-continued

| Coating | Polymer | CTA (wt %) | Acid Number | pH | Appearance |
|---|---|---|---|---|---|
| Example 9 | EMA/MAA 85/15 wt % | 0 | 97.8 | 9.38 | Excellent |
| Example 10 | EMA/MAA 85/15 wt % | 1 | 97.8 | 9.25 | Excellent |
| Example 11 | MMA/MAA 90/10 wt % | 2 | 65.2 | 9.0 | Excellent |
| Example 12 | MMA/BA/MAA 65/25/10 wt % | 0 | 65.2 | 10.0 | Excellent |
| Example 13 | MMA/BA/MAA 70/20/10 wt % | 1 | 65.2 | 9.0 | Excellent |

Comparative Samples J–N and Examples 14–19

The following examples demonstrate the excellent physical properties that are obtained with coating compositions of the present invention. Aqueous protective overcoat formulations comprising 7 wt % total solids are applied onto the dried antistatic layer as in the previous examples and dried at 100° C. for 2 minutes to give a dry coating weight of 1076 mg/$m^2$. It is known (described in U.S. Pat. Nos. 5,006,451 and 5,221,598) that the antistatic properties of the vanadium pentoxide layer are destroyed after film processing if not protected by an impermeable barrier. Thus the permeability of the example protective overcoat layers could be evaluated by measuring the antistatic properties of the samples after processing in conventional film developing and fixing solutions.

The samples are soaked in high pH (11.3) developing and fixing solutions as described in U.S. Pat. No. 4,269,929, at 38° C. for 60 seconds each and then rinsed in distilled water. The internal resistivity (using the salt bridge method, described in R. A. Elder, "Resistivity Measurements on Buried Conductive Layers", EOS/ESD Symposium Proceedings, Sept. 1990, pages 251–254.) of the processed samples at 20% relative humidity is measured and compared with the internal resistivity before processing. The abrasion resistance for the dried coating is measured in accordance with the procedure set forth in ASTM D1044. The results are given in Table 2. $M_w$ in Table 2 represents the weight average molecular weight of the polymer. Elvacite 2041 is methyl methacrylate polymer sold by ICI Acrylic Inc. and is coated from organic solvent to give a dry coating weight of 1076 mg/$m^2$.

Comparative samples J–L demonstrate that aqueous coating compositions containing high Tg vinyl copolymers having high acid numbers at low solution pH yield coatings that have very poor resistance to mechanical scratch and abrasion, and the samples do not preserve the antistatic properties after film processing indicating that although the coatings are transparent they are not impermeable. Comparative sample M contains a methyl methacrylate polymer coated from organic solvent, and the coating therefore has excellent quality and good scratch resistance and protects the antistatic layer during film processing. Comparative sample N contains a polymer with an acid number of 97.8, a Tg greater than 50° C., and is applied from a coating composition with a pH of 9.0. However, sample N did not contain a crosslinking agent capable of reacting with carboxylic acid groups and, therefore, the dried film is not impermeable to film processing solutions. On the other hand, the coatings prepared from aqueous coating compositions in accordance with the present invention have excellent film quality and superior resistance to mechanical scratch and abrasion and protect an underlying antistatic layer from attack from film processing solutions.

While there has been shown and described what are at present considered the preferred embodiments of the invention, it will be obvious to those skilled in the art that various alterations and modifications may be made therein without departing from the scope of the claimed invention as defined by the appended claims. All such modifications are intended to be included in the present application.

TABLE 2

| Coating | Polymer | $M_w$ | pH | wt % Crosslinker | Resistivity Before Processing log Ω/□ | Resistivity After Processing log Ω/□ | Taber Abr. % haze |
|---|---|---|---|---|---|---|---|
| Sample J | MMA/MAA Acid #: 97.8 | $2.5 \times 10^5$ | 2–2.5 | 10 | 7.2 | 13.0 | 14.9 |
| Sample K | MMA/MAA Acid #: 97.8 | $2.4 \times 10^4$ | 2–2.5 | 10 | 7.2 | 13.0 | 15.7 |
| Sample L | MMA/MAA Acid #: 130.4 | $2.9 \times 10^5$ | 2–2.5 | 0 | 7.2 | 13.0 | 15.6 |
| Sample M | Elvacite 2041, solvent coated | — | — | — | 7.2 | | 9.0 |
| Sample N | MMA/MAA Acid #: 130.4 | $2.5 \times 10^5$ | 9.0 | 0 | 7.2 | 13.0 | 8.9 |
| Example 14 | MMA/MAA Acid #: 97.8 | $2.5 \times 10^5$ | 9.0 | 10 | 7.2 | 7.3 | 8.6 |
| Example 15 | MMA/MAA Acid #: 97.8 | $2.4 \times 10^4$ | 9.2 | 10 | 7.2 | 7.2 | 9.2 |
| Example 16 | MMA/MAA Acid #: 130.4 | $2.9 \times 10^5$ | 7.5 | 20 | 7.2 | 7.3 | 8.5 |
| Example 17 | EMA/MAA Acid #: 97.8 | $3.2 \times 10^5$ | 9.5 | 10 | 7.2 | 7.6 | 8.4 |
| Example 18 | EMA/MAA Acid #: 97.8 | $5.0 \times 10^4$ | 9.2 | 10 | 7.2 | 7.1 | 10.8 |
| Example 19 | MMA/MAA Acid #: 81.5 | $2.4 \times 10^4$ | 9.0 | 10 | 7.1 | 7.1 | 10.4 |

We claim:

1. An imaging element comprising a support:

an image forming layer;

an antistatic layer; and a protective layer overlying said antistatic layer formed from an aqueous coating composition containing a film forming binder and a crosslinking agent wherein the film forming binder comprises a carboxylic acid containing vinyl polymer having a glass transition temperature of greater than 50° C. and an acid number of from 60 to 260 wherein the carboxylic acid containing vinyl polymer is reacted with ammonia or amine so that the coating composition has pH of from 7 to 10.

2. The imaging element of claim 1 wherein the carboxylic acid containing vinyl polymer of the coating composition is obtained by interpolymerizing one or more ethylenically unsaturated monomers containing carboxylic acid groups with other ethylenically unsaturated monomers.

3. The imaging element of claim 2 wherein the ethylenically unsaturated monomers containing carboxylic acid groups is selected form the group consisting of acrylic monomers, monoalkyl itaconates, monoalkyl maleates, citraconic acid and styrene carboxylic acid.

4. The imaging element of claim 2 wherein the other ethylenically unsaturated monomers are selected from the group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl acetate, vinyl propionate, vinylidene chloride, vinyl chloride, vinyl aromatic compounds, dialkyl maleates, dialkyl itaconics, dialkyl methylene-malonates, isoprene and butadiene.

5. The imaging element of claim 1 wherein the antistatic layer comprises vanadium pentoxide.

6. The imaging element of claim 1 wherein the protective layer further comprises a lubricant.

7. The imaging element of claim 1 wherein the protective layer further comprises matte particles.

8. The imaging element of claim 1 wherein the crosslinking agent is selected from the group consisting of epoxy compounds, polyfunctional aziridines, methoxyalkyl melamines, triazines, polyisocyanates and carbodimmides.

9. The imaging element of claim 1 wherein the crosslinking agent comprises from 5 to 30 weight percent of the carboxylic acid containing vinyl polymer.

10. The imaging element of claim 1 wherein the acid number is from 60 to 150.

11. The imaging element of claim 1 wherein the protective layer comprises an outermost layer.

* * * * *